United States Patent
Jeon (10) Patent No.: US 11,951,837 B2
(45) Date of Patent: Apr. 9, 2024

(54) DECORATED SWITCH FOR VEHICLES AND INTERIOR PANEL FOR VEHICLES

(71) Applicants: SEOYON E-HWA CO., LTD., Anyang (KR); SEOYON AMERICA CORPORATION, Auburn Hills, MI (US)

(72) Inventor: Jong Hwan Jeon, Anyang (KR)

(73) Assignees: SEOYON E-HWA CO., LTD., Anyang (KR); SEOYON AMERICA CORPORATION, Auburn Hills, MI (US)

( * ) Notice: Subject to any disclaimer, the term of this patent is extended or adjusted under 35 U.S.C. 154(b) by 0 days.

(21) Appl. No.: 17/932,294

(22) Filed: Sep. 15, 2022

(65) Prior Publication Data
US 2023/0136371 A1  May 4, 2023

(30) Foreign Application Priority Data

Oct. 29, 2021 (KR) .......................... 10-2021-0146616

(51) Int. Cl.
*B60K 37/06* (2006.01)

(52) U.S. Cl.
CPC .......... *B60K 37/06* (2013.01); *B60K 2370/34* (2019.05); *B60K 2370/345* (2019.05)

(58) Field of Classification Search
CPC ................ B60K 37/06; B60K 2370/34; B60K 2370/345
See application file for complete search history.

(56) References Cited

U.S. PATENT DOCUMENTS

| 2003/0148044 | A1* | 8/2003 | Auld | ........................ B44C 3/02 428/354 |
| 2012/0200475 | A1* | 8/2012 | Baker | ..................... G09F 13/04 345/4 |
| 2015/0042569 | A1 | 2/2015 | Choi | |
| 2018/0065547 | A1* | 3/2018 | Kirilenko | ................ F16H 63/42 |
| 2021/0024017 | A1* | 1/2021 | Leber | ..................... A44C 17/00 |

FOREIGN PATENT DOCUMENTS

| JP | 2000-306453 A | 11/2000 |
| JP | 3074287 U | 12/2000 |
| JP | 2003-162931 A | 6/2003 |
| KR | 10-1209582 B1 | 12/2012 |

OTHER PUBLICATIONS

KR OA dated Jan. 5, 2022.

\* cited by examiner

*Primary Examiner* — Evan P Dzierzynski
*Assistant Examiner* — Nathaniel J Lee
(74) *Attorney, Agent, or Firm* — Harvest IP Law, LLP (57) ABSTRACT

There is provided a switch installed in a vehicle. The switch includes a cover made of a transparent material, a plate disposed below the cover in an inner side of the cover, and a film combined to the plate, the film having a printed pattern printed thereon. The pattern printed on the film is enlarged by refraction of a light from the pattern while the light passing through the cover, and then is visible enlarged to eyes of a user.

12 Claims, 8 Drawing Sheets

DECORATED SWITCH FOR VEHICLES AND INTERIOR PANEL FOR VEHICLES

CROSS REFERENCE TO RELATED APPLICATION

The present application claims priority to Korean Patent Application No. 10-2021-0146616, filed Oct. 29, 2021, the entire contents of which is incorporated herein for all purposes by this reference.

BACKGROUND OF THE INVENTION

1. Field of the Invention

The present disclosure relates to a decorated switch for a vehicle, more particularly to a decorated switch for a vehicle and an interior panel for a vehicle including the decorated switch, the decorated switch having a structure improved by using the refraction of light that occurs on a cover or producing the cover having a surface obtaining by connecting polygonal flat surfaces with each other, so that a pattern printed on a film disposed under the flat surface is visible to a user in a form like a jewel.

2. Background of Technology

Many switches are installed in a vehicle, and the installed switches have different shapes and sizes.

As vehicle-related technique is developed, the demand for aesthetic factors is increasing along with the demand for excellence in driving performance such as the output or acceleration of a vehicle, and in riding comfortability realized by a suspension device. The demand for aesthetic factors includes the demand for the design of switches looking fancy, exclusive and luxurious.

With such a design demand, the interior including a switch of a vehicle, in particular, a passenger car, is decorated with various decorative materials. Glossy decorative materials called high glossy, metal decorative materials with a surface like metal, and wood decorative materials with a surface like wood are commonly used among the decorative materials.

However, the preference of consumers for the conventional decorative materials described above is gradually falling as the decorative materials have been used for a long time. Thus, the demand for decorative materials that provides a new feeling is increasing.

SUMMARY OF THE INVENTION

One of the objects of the present disclosure is to provide a decorated switch for a vehicle and an interior panel for a vehicle, that satisfy needs of consumers by providing a switch having a surface decorated with a decorative material providing a new feeling that consumers have not experienced, such as jewelry-looking surfaces.

According to a first aspect of the present disclosure, there is provided a switch installed in a vehicle. The switch includes a cover made of a transparent material, a plate disposed below the cover in an inner side of the cover, and a film combined to the plate, the film having a printed pattern printed thereon. The pattern printed on the film is enlarged by refraction of a light from the pattern while the light passing through the cover, and then is visible enlarged to eyes of a user.

The plate may be made of a transparent material. The film may be combined on a surface of the plate away from the cover or may be combined to a surface of the plate facing the cover, while the printed pattern of the film facing the cover.

Preferably, the cover and the plate are disposed to be spaced apart from each other by a predetermined distance so that an air layer is located between the cover and the plate.

Preferably, an inner surface of the cover is produced with a surface having at least one continuous portion of polygonal flat surfaces.

Preferably, the cover, the plate, and the film are disposed so that the cover abuts on the plate or the film, and at least a portion of an outer surface of the cover is produced with a surface having at least one continuous portion of polygonal flat surfaces.

The printed pattern on the film may be a continuous polygonal pattern.

According to a second aspect of the present disclosure, there is provided an interior panel for a vehicle including the decorated switch for a vehicle.

According to the present disclosure, it is possible to provide a decorated switch for a vehicle and an interior panel for a vehicle including the decorated switch for a vehicle, that is capable of providing an aesthetic feeling of jewel or crystal that is different from the known interior decoration of a vehicle without increasing the manufacturing cost too much, by using refraction of light or producing a cover having a surface obtaining by connecting polygonal flat surfaces with each other.

BRIEF DESCRIPTION OF THE DRAWINGS

The above and other objectives, features, and other advantages of the present disclosure will be more clearly understood from the following detailed description taken in conjunction with the accompanying drawings, in which:

FIGS. 1A to 2B are views for explaining various arrangements of a cover, a plate, and a film according to embodiments of the present disclosure.

DETAILED DESCRIPTION OF INVENTION

Hereinafter, preferred embodiments of the present disclosure will be described in detail with reference to the drawings in order to provide specific contents for embodying the present disclosure.

A decorated switch for a vehicle according to a first exemplary embodiment of the present disclosure will be described below.

The decorated switch for a vehicle according to an embodiment is a switch that is installed in a vehicle and can provide an excellent and unique aesthetic feeling and is configured to include a cover 10, a plate 20, and a film 30. An air layer 40 filled with an air may be provided between the cover 10 and the plate 20 or between the cover 10 and the film 30. Components such as sensors, boards, actuators, and the like related to various actions provided when a user pushes on switches may be installed below the plate 20 according to an embodiment. Such components do not directly relate to the present disclosure, and thus detailed descriptions thereof will not be provided in this specification.

The cover 10 may be produced with a transparent material according to an embodiment and may be produced with a material such as polycarbonate (PC).

Figure 1A:
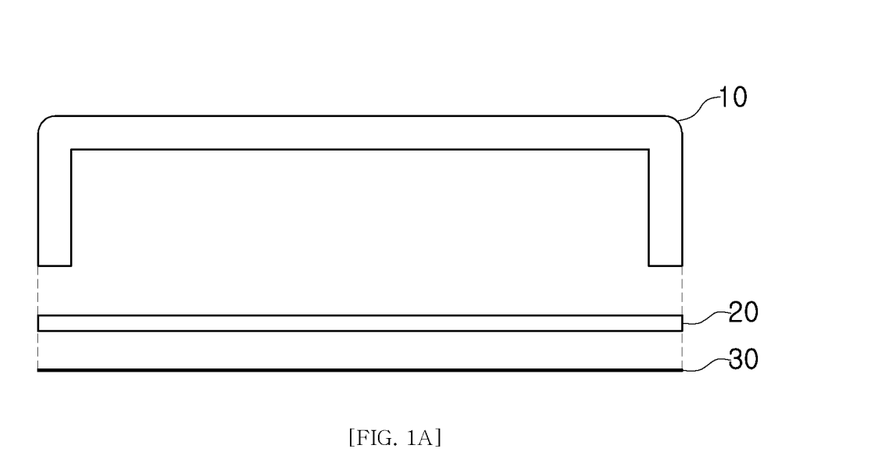
Figure 1B:
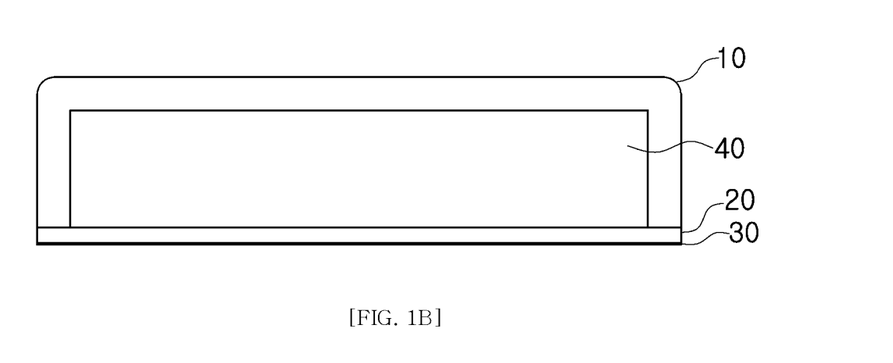
Figure 2A:
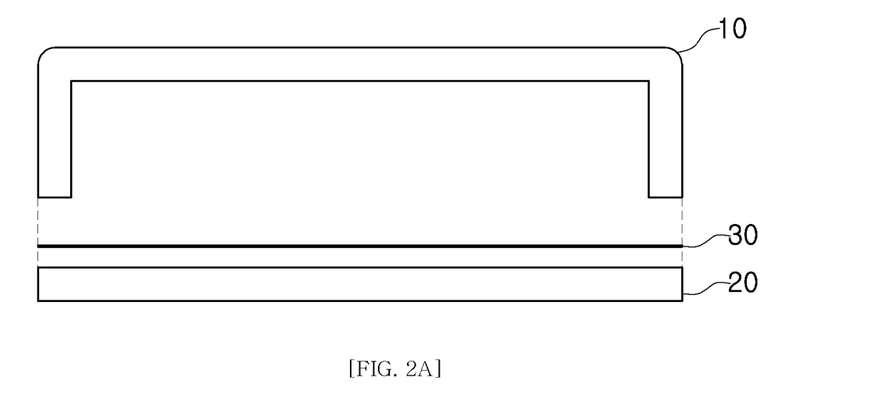
Figure 2B:
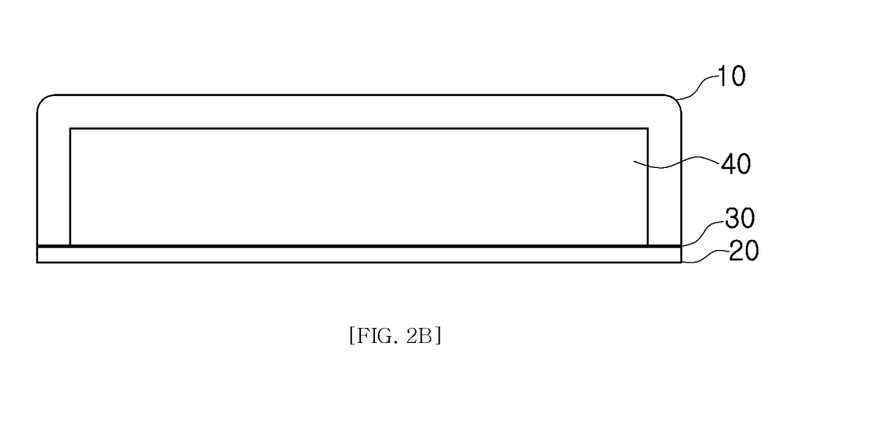

As illustrated in FIGS. 1A to 2B, the plate 20 may be configured to have a flat plate and be disposed below the cover 10 to be spaced from an inner side surface of the cover 10 by a predetermined distance. FIGS. 1A and 2A illustrate a state where the cover 10, the plate 20, and the film 30 are separated from each other. FIGS. 1B and 2B illustrate a state where the cover 10, the plate 20, and the film 30 are combined with each other.

The plate 20 functions to fix the film 30.

The cover 10 and the plate 20 may be disposed such that the above-described air layer 40 is formed to form a sense of three-dimensional space and light reflected from the film 30 is appropriately refracted.

The film 30 is combined to the plate 20 and has a configuration in which a predetermined pattern is printed. The film 30 may be produced in glossy or matte, and the pattern may be produced in various forms according to the preference of the user.

Regarding the up-down arrangement relationship between the film 30 and the plate 20, the film 30 may be combined to the lower portion of the plate 20 as illustrated in FIGS. 1A and 1B, or the film 30 may be combined to the upper portion of the plate 20 as illustrated in FIGS. 2A and 2B. The plate 20 may be made of a transparent material in order to combine the film 30 to the lower portion of the plate 20. The plate 20 may be produced with a material such as polycarbonate (PC), similar to the cover 10.

FIG. 1B or 2B illustrates the state where the cover 10, the plate 20, and the film 30 are combined with each other. The pattern printed on the film 30 is seen to be enlarged by refraction.

Figure 3A:
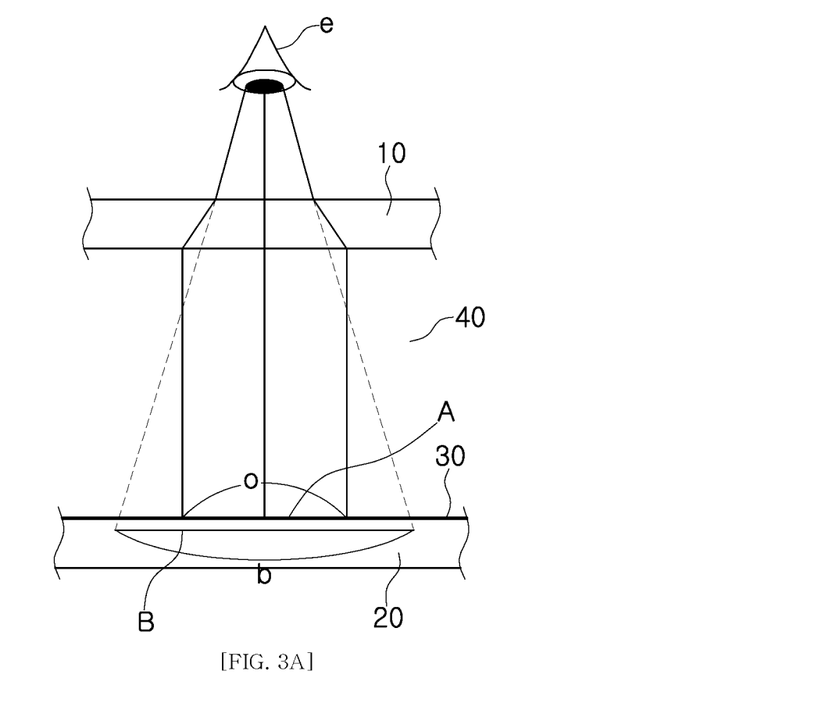
FIG. 3A is a view for explaining enlargement of a pattern visible to a user by refraction of light occurring on the cover.

FIG. 3A is a exemplary view for explaining the principle that the pattern formed on the film 30 is enlarged by refraction. A in FIG. 3A indicates a portion of the actually printed pattern. Light reflected from A is refracted twice in the process of passing through the cover 10. That is, the light is firstly refracted when the light enters from the air layer 40 into the cover 10, and is secondly refracted when the light is emitted from the cover 10 to the outside of the cover 10. The reason that such refraction occurs is because the media of the cover 10 and the air layer 40 are different. The cover 10 is a relatively dense medium, and the air in the air layer 40 is a relatively sparse medium. Light is refracted when the light enters from a sparse medium into a dense medium and when entering from a dense medium into a sparse medium. As a result, the light passing through the cover 10 is refracted twice.

Such the refraction described above causes A to look like B to the eyes (e) of the user. Though B is marked under A in order to distinguish B from A in FIGS. 3A, B and A in fact are seen to be in the same plane to the human eye. In FIG. 3A, the length of A is o, and the length of B is b longer than o. As described above, due to the refraction, from the perspective of human eye (e), a pattern as an enlarged image instead of the actual pattern printed on the film 30 is visible to the human eye (e).

Figure 3B:
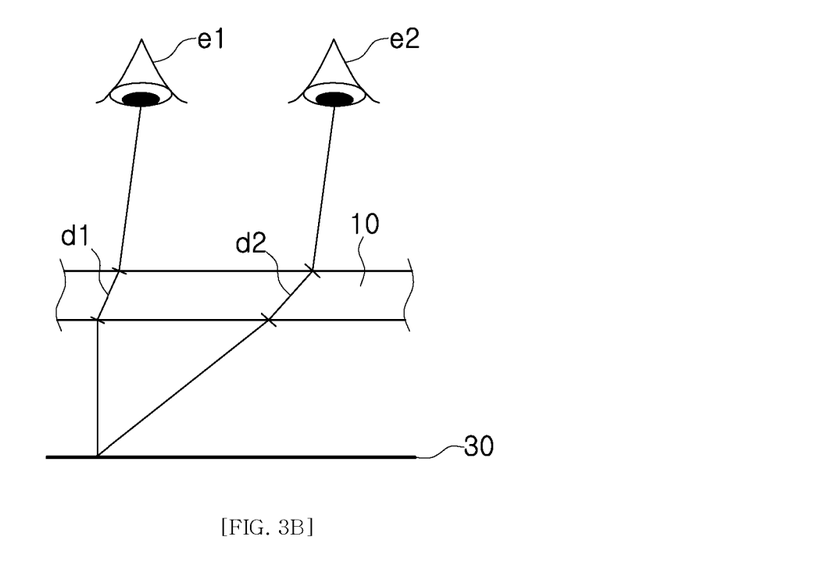
FIG. 3B is a view for explaining a difference in enlargement ratio of the pattern visible to the user depending on a position of an eye.

The pattern of the film 30 is visible to be enlarged at a different ratio depending on the viewing angle. This is because the length of the passage of the light passing through the cover 10 is different depending on the position of the eye. As illustrated in FIG. 3B, the path of light reaching the left eye (e1) is different from the path of light reaching the right eye (e2). The lengths of the passages of the light passing through the cover 10 are set as $d_1$ and $d_2$ from such different paths. The difference in length of the passages causes different refraction paths.

Figure 4:
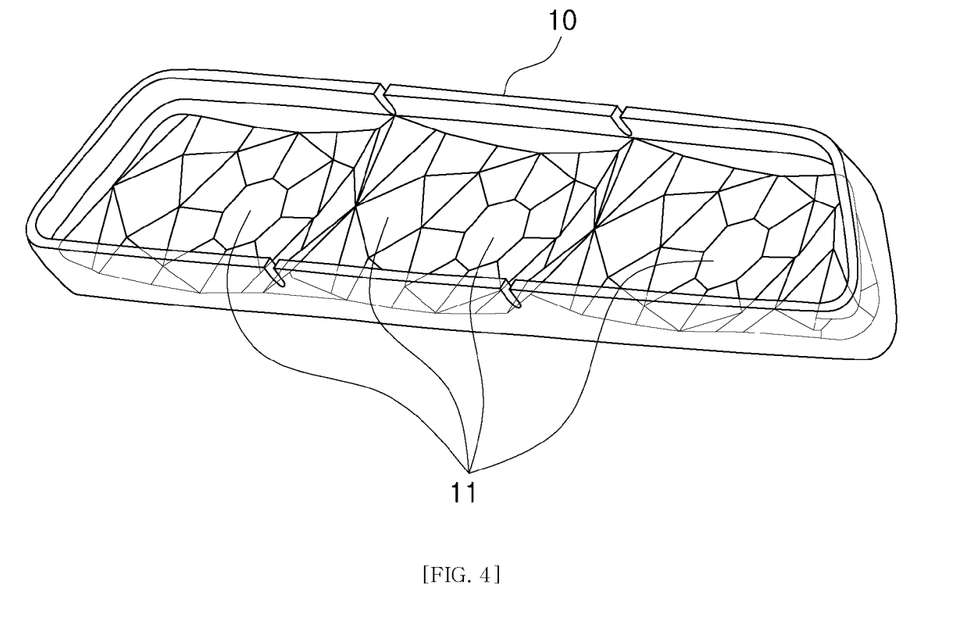
FIG. 4 is a picture showing an example of a polygonal pattern printed on the film.

A continuous or consecutive polygonal pattern as in the picture in FIG. 4 may be printed on the film 30 included in the decorated switch for a vehicle according to the first example described above. In a case where the film 30 on which the continuous or consecutive polygonal pattern is printed is adopted as described above, it is possible to provide an image similar to a well-cut jewel to the eyes of the user and thus to expect an effect of providing an excellent and unique aesthetic feeling as compared to a conventional switches.

A decorated switch for a vehicle according to a second example of the present disclosure will be described below.

Similar to the above-described example, the decorated switch for a vehicle according to the second embodiment is a switch that is installed in a vehicle and can provide an excellent and unique aesthetic feeling and is configured to include a cover 10, a plate 20, and a film 30. An air layer 40 filled with an air is provided between the cover 10 and the plate 20 or between the cover 10 and the film 30.

The cover 10 may be made of a transparent material. The inner surface or the outer surface of the cover 10 may be produced with a surface of continuous or consecutive polygonal flat surfaces 11.

Figure 5:
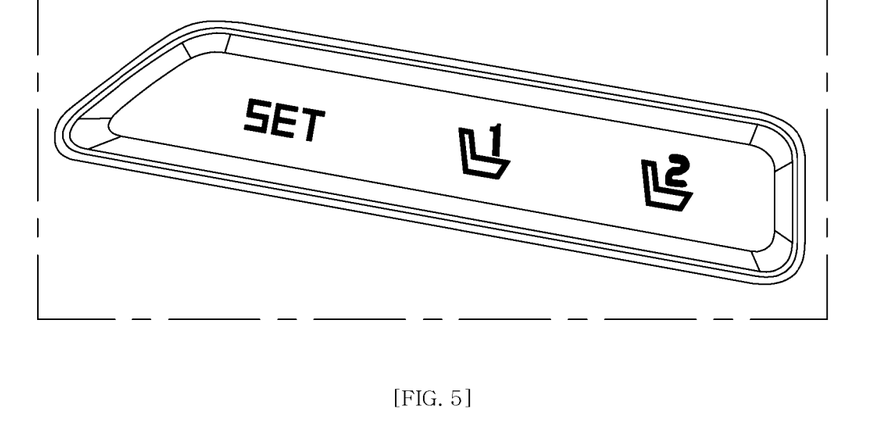
FIG. 5 is a view showing that a surface of continuous or consecutive flat surfaces is formed on an inner surface of the cover according to an embodiment of the present disclosure.
Figure 6:
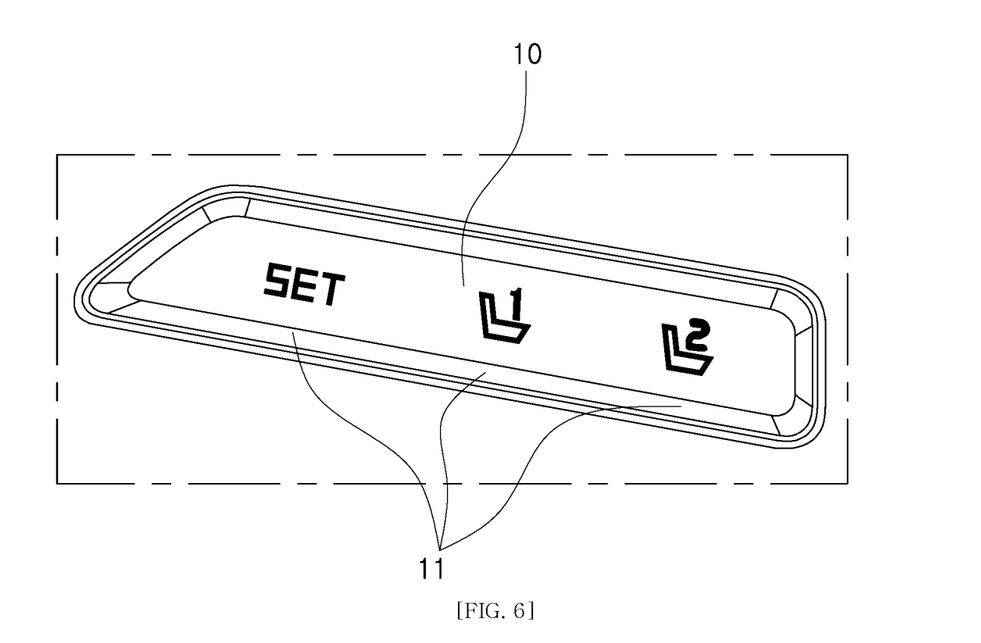
FIG. 6 is a view showing that a surface of continuous or consecutive flat surfaces is formed on the outer surface of the cover according to an embodiment of the present disclosure.

For an example, FIG. 5 shows the cover 10 in which the continuous or consecutive polygonal flat surfaces 11 are etched on the inner surface. For another example, FIG. 6 shows the cover 10 in which the continuous or consecutive polygonal flat surfaces 11 are etched on a portion of the outer surface.

The plate 20 and the film 30 may have configurations corresponding to the configurations in the above-described examples, and thus detailed descriptions thereof will not be repeated.

The principle of the effect that can be expected when the inner surface or the outer surface of the cover 10 is etched in a form of continuous or consecutive polygonal flat surfaces is as follows.

The user can see the switch because light emitted from a light source, such as the sun or a lighting outside or inside the vehicle, is reflected from the switch and reaches the eyes of the user. At this time, the lights may pass through several different paths. Some rays of a light from outside of the switch are reflected from the front surface of the cover 10 and then reaches the eyes, and some rays of the light from outside of the switch pass through the cover 10, and are reflected from the film 30, and then reaches the eyes. The rays of the light reflected from the film 30 reach the eyes in a state of being refracted while passing through the cover 10.

While the inner surface or the outer surface of the cover 10 is etched with a form of the continuous or consecutive polygonal flat surfaces 11, because the entering angle and intensity of the light into the respective etched flat surfaces 11 may vary, and the degrees of the light being refracted on the respective etched flat surfaces 11 may vary, a three-dimensional shape is seen to the eyes of the user.

Even if the film 30 has a monochromatic pattern, each flat surface 11 is seen in a different color to the human eye, for example, a certain plane 11 from among the continuous or consecutive polygonal flat surfaces 11 etched on the cover 10 is seen in a dark color and another certain plane 11 is seen in a bright color. Thus, the monochromatic pattern may look as if a three-dimensional pattern is printed.

A third example of the present disclosure will be described below.

Figure 7A:
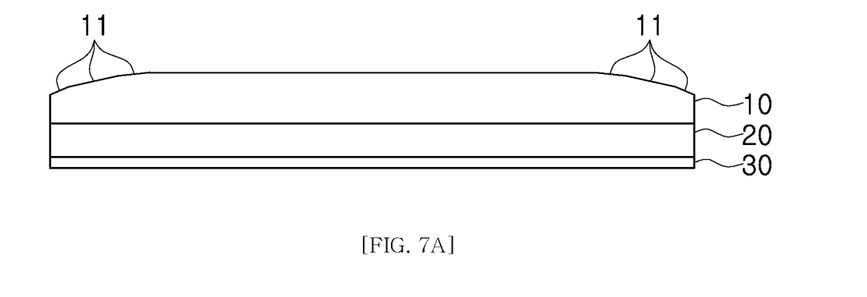
FIGS. 7A and 7B are views for explaining arrangement of a cover, a plate, and a film according to another embodiment of the present disclosure.
Figure 7B:
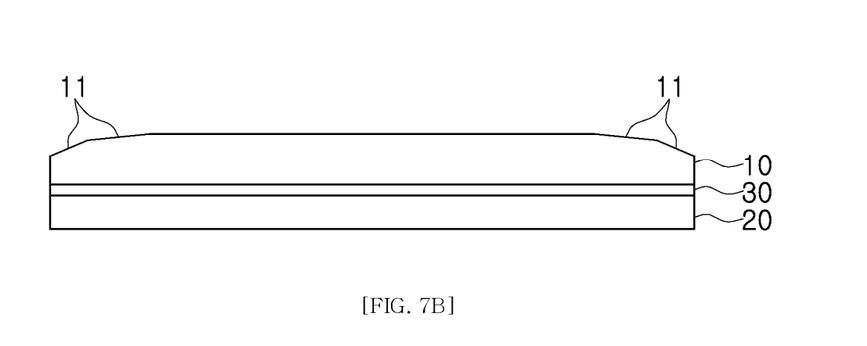
Figure 8A:
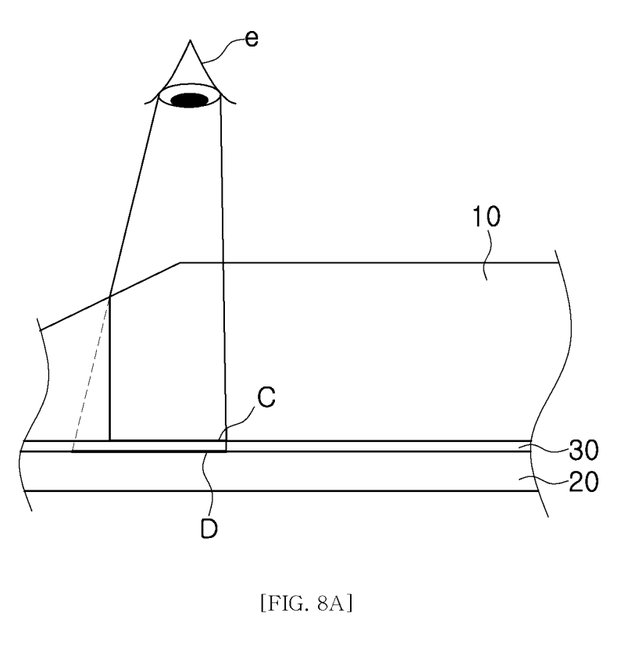
FIGS. 8A and 8B are views for explaining that a pattern visible to a user varies depending on a position of an eye when a cover of continuous or consecutive polygonal flat surfaces is adopted according to an embodiment of the present disclosure.
Figure 8B:
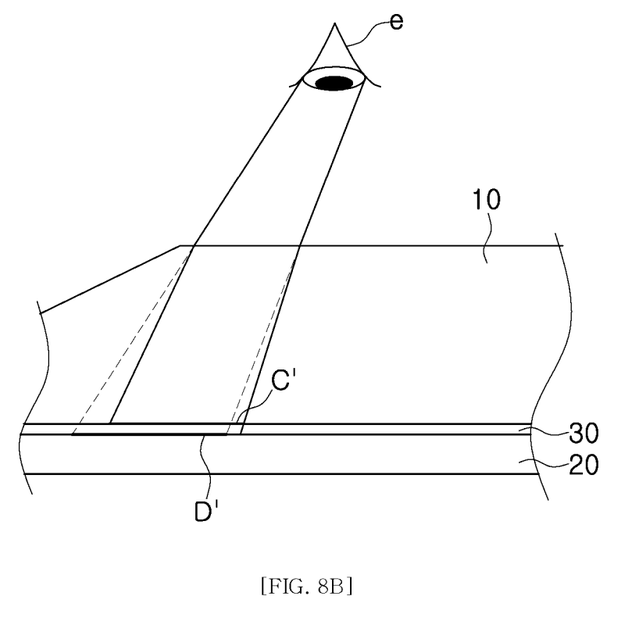

FIGS. 7A and 7B are views for explaining arrangement of a cover, a plate, and a film according to another embodiment of the present disclosure. FIGS. 8A and 8B are views for explaining that a pattern visible to a user varies depending on a position of an eye when a cover of continuous or consecutive polygonal flat surfaces is adopted.

A decorated switch for a vehicle according to the present embodiment is configured to include a cover 10, a plate 20, and a film 30. Differing from the embodiments previously described, the cover 10, the plate 20, and the film 30 are disposed such that the cover 10 abuts on the plate 20 or the film 30. In a case where the film 30 is located on an side of the plate 20 away from the cover 10 as illustrated in FIG. 7A, the cover 10 abuts on the plate 20. In a case where the film 30 is located on a side of the plate 20 toward or facing the cover 10, the cover 10 abuts on the film 30. In both cases of FIG. 7A and FIG. 7B, the printed patter on the film 30 are placed facing the cover 10.

As similar to features illustrated in FIGS. 6 to 7B, in the decorated switch for a vehicle according to the present example, continuous or consecutive polygonal flat surfaces 11 are etched on (a portion of) the outer surface of the cover 10.

FIGS. 8A and 8B are views for explaining that the same patterns are seen in different forms due to refraction varying depending on the positions of the eyes. The pattern indicated by C is seen as D at the position of the eye illustrated in FIG. 8A, but the pattern indicated by C' is seen as D' at the position of the eye illustrated in FIG. 8B. The patterns indicated by C and C' are actually the same patterns, but are seen as D or D' depending on the position of the eye of the user. D and D' indicate the similar patterns, but the sizes or the positions thereof are seen to differ. This is also a phenomenon that occurs because the refraction of the light incident on the eye varies depending on the position of the eye.

As described above, the present disclosure has an effect of giving a user an excellent and unique decorative feeling by forming any one pattern to look different depending on the position of the eye with the principle of refraction.

If continuous or consecutive polygonal flat surfaces are etched on either the inner or outer surface of the cover 10, the visual effect is similar. In a case where the outer surface of the cover 10 is etched, the outer surface itself may have unevenness. In a case where the inner surface of the cover 10 is etched, the outer surface is smooth. Thus, which surface the polygonal flat surface is etched on is an optional point, and may be appropriately selected by the preference survey of the user. The flat surfaces 11 may be etched on both the inner surface and the outer surface of the cover 10. In this case, a complex pattern is visible to the eyes of the user. Such a point is also included in the options, and which surface the flat surface is etched on may be determined by the preference survey of the user.

The embodiments of the present disclosure may be applied to any interior panel for a vehicle including the above-described decorated switch for a vehicle. The interior panel for a vehicle refers to all panels installed in the vehicle. As long as a panel is installed in the vehicle, this panel may serve as the interior panel for a vehicle regardless of the installation location such as a door, a dashboard, and a ceiling.

The interior panel for a vehicle is characterized by the above-described decorated switch for a vehicle, and there is no difficulty in applying the decorated switch for a vehicle to other interior panels for a vehicle. Thus, the additional description of other interior panels for a vehicle will be omitted.

Hitherto, the three examples of the present disclosure have been described to provide the specific contents for embodying the present disclosure. However, the technical ideas of the present disclosure are not limited to the above examples, and decorated switches for a vehicle and interior panels for a vehicle including the decorated switches for a vehicle can be made in various forms within a range without departing from the technical ideas of the present disclosure.

Also, it is noted that any one feature of an embodiment of the present disclosure described in the specification may be applied to another embodiment of the present disclosure.

Although the above description of the present disclosure has been provided for illustrative purposes, those skilled in the art will appreciate that various modifications, additions, and substitutions are possible, without departing from essential characteristics of the disclosure. Therefore, embodiments of the present disclosure are not intended to limit the technical spirit of the disclosure but rather to describe the technical spirit of the disclosure, and the scope of the disclosure is not to be limited by the above embodiments. The scope of the present disclosure is defined only by the accompanying claims and the equivalents thereof.

What is claimed is:

1. A decorated switch for a vehicle, that is installed in a vehicle, the switch comprising:
   a cover made of a transparent material, the cover's inner surface being etched such that the cover's inner surface is formed as an inner uneven surface composed of continuous multiple polygonal flat surfaces;
   a flat plate disposed spaced apart from and below the cover in an inner side of the cover such that an air layer is located between the inner uneven surface composed of continuous multiple polygonal flat surfaces and the flat plate; and
   a film combined to the flat plate, the film having a printed pattern printed thereon,
   wherein the pattern printed on the film is enlarged by refraction of a light from the pattern while the light passing through the cover, and then is visible enlarged to eyes of a user,
   wherein the light from the pattern passes through the air layer and the cover consecutively while being refracted at least two times.

2. The decorated switch for a vehicle according to claim 1, wherein
   the flat plate is made of a transparent material, and
   the film is combined on a surface of the flat plate away from the cover, while the printed pattern of the film facing the cover.

3. The decorated switch for a vehicle according to claim 1, wherein
the film is combined to a surface of the flat plate facing the cover.

4. The decorated switch for a vehicle according to claim 1, wherein
the film is in a flat form, and
the printed pattern is a continuous polygonal pattern printed on the film in the flat form.

5. An interior panel for a vehicle, the panel comprising:
the decorated switch for a vehicle according to claim 1.

6. The interior panel for a vehicle according to claim 5, wherein
the flat plate is made of a transparent material, and
the film is combined on a surface of the flat plate away from the cover the cover, while the printed pattern of the film facing the cover.

7. The interior panel for a vehicle according to claim 5, wherein
the film is combined to a surface of the flat plate facing the cover.

8. The interior panel for a vehicle according to any one of claim 5, wherein
the film is in a flat form, and
the printed pattern is a continuous polygonal pattern printed on the film in the flat form.

9. The decorated switch for a vehicle according to claim 1,
wherein the cover's outer surface is etched such that the cover's outer surface is formed as an outer uneven surface composed of continuous multiple polygonal flat surfaces,
such that the cover is formed between the inner uneven surface composed of continuous multiple polygonal flat surfaces and the outer uneven surface composed of continuous multiple polygonal flat surfaces, and
such that the light from the printed pattern sequentially passes through the air layer, the inner uneven surface composed of continuous multiple polygonal flat surfaces, and the outer uneven surface composed of continuous multiple polygonal flat surfaces.

10. The decorated switch for a vehicle according to claim 9, wherein the continuous multiple polygonal flat surfaces composing the inner uneven surface have different shapes from the continuous multiple polygonal flat surfaces composing the outer uneven surface.

11. The decorated switch for a vehicle according to claim 9,
wherein the printed pattern printed on the film is a continuous polygonal pattern forming a single flat sheet,
such that the light from the continuous polygonal pattern sequentially passes through the air layer, the inner uneven surface composed of continuous multiple polygonal flat surfaces, and the outer uneven surface composed of continuous multiple polygonal flat surfaces.

12. The decorated switch for a vehicle, that is installed in a vehicle, the switch comprising:
a cover made of a transparent material;
a flat plate disposed below the cover in an inner side of the cover; and
a flat film combined to the flat plate, the flat film having a printed flat pattern printed thereon,
wherein the flat pattern printed on the flat film is enlarged by refraction of a light from the pattern while the light passing through the cover, and then is visible enlarged to eyes of a user,
wherein the cover and the plate are disposed to abut on each other, and
at least a portion of an outer surface of the cover is produced with a surface having at least one continuous portion of polygonal flat surfaces,
wherein the printed flat pattern on the flat film is a continuous polygonal pattern forming a single flat sheet.

* * * * *